Patented Aug. 26, 1930

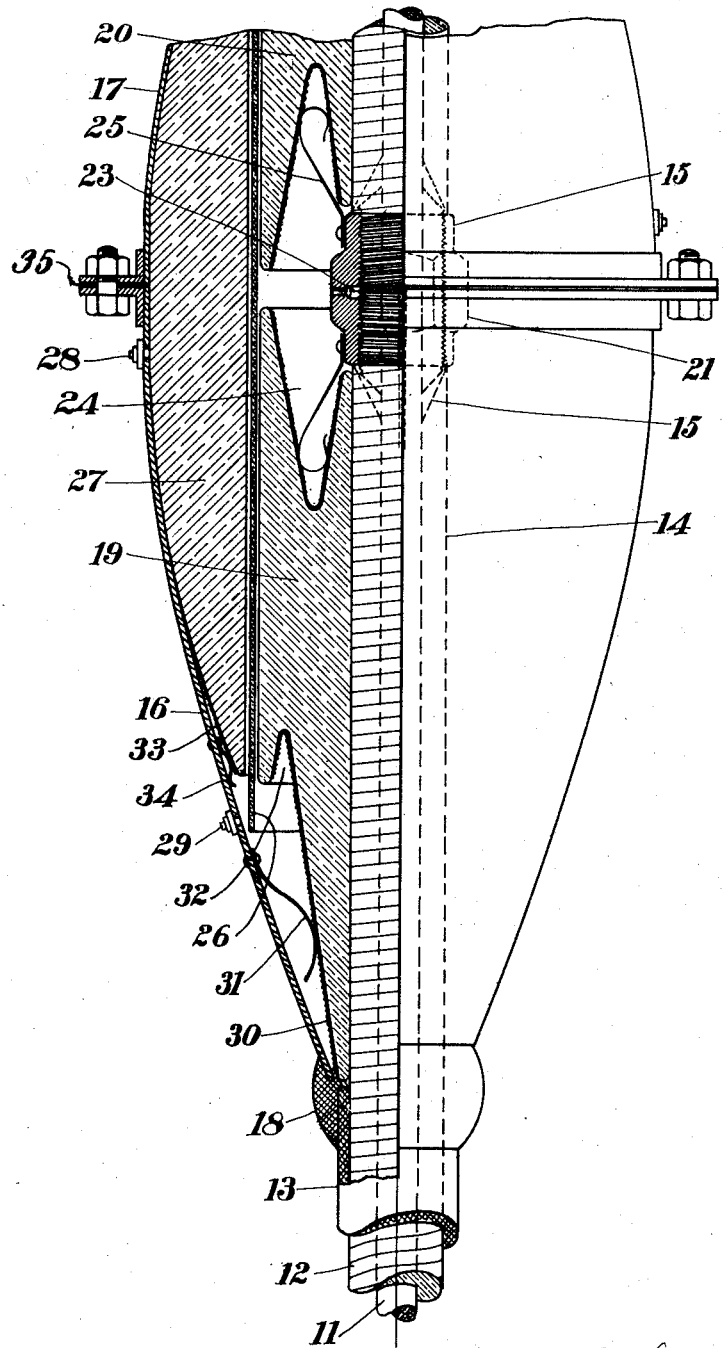

1,773,713

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

JOINT FOR COVERED CONDUCTORS

Application filed August 5, 1926. Serial No. 127,274.

This invention relates to means for connecting the ends of high potential cables and has for one of its objects the provision of a cable joint which may be easily made and which when completed will have at least as high a degree of efficiency as the unbroken cable covering.

Other objects and advantages will appear from the following description.

The invention is exemplified in the combination and arrangement of parts shown in the accompanying drawing and described in the following specification, and it is more particularly pointed out in the appended claims.

In the drawing, the figure is an elevation, with parts in section, showing a cable joint embodying one form of the present invention.

The reliability of a high voltage cable is frequently limited by the joint. Most high voltage cables have a conductor which may be either solid or hollow, covered by a layer of varnished cambric or paper, impregnated by oil or other insulating compound. This is covered by a lead sheath to prevent the entrance of moisture and also to prevent the escape of filling oil or compound.

Ordinarily it is a difficult matter to make a joint in a cable made up in this way, particularly where the splice has to be made in manholes. To obviate this difficulty I have invented a new type of cable joint or splice which greatly facilitates making the joint and eliminates a large part of the hazard. With the improved type of cable joint it is possible to make up joints for practically any voltage and, at the same time, the tendency to break down at the joint can be reduced or entirely eliminated.

In the form of the invention shown in the drawing, the conductor 11 is covered by a layer of insulation 12 in the lead sheath 13. In making up the joint, the lead sheath is stripped from the section 14 and terminal fittings 15 sweated to the ends of the conductor 11. The metal bells or covers 16 and 17 are then slipped back over the cable, or, if preferred and working space will permit, the metal bell 16 is joined to the lead sheath 13 by the wiped joint 18 or by a flange coupling. The dielectric members 19 and 20 which may be made of porcelain or similar material are then slipped back over the ends of the cable into position. It is necessary to leave one of the wiped or clamped joints 18 free until after the joint is properly made up. The nut 21 which has a right and left thread is then started and the two fittings 15 tightened up. Where the hollow cables are used, the fittings 15 have vents 23 which permit of the escape of oil or filling compound into the recess adjacent the nut. The nut can be thoroughly tightened up by using a thin wrench, as the members 19 and 20 are separated slightly for this purpose. The control pockets 24 are metallized and are in electrical contact with the nut by means of springs 25 or other suitable means. After the nut has been tightened up, a band may be drawn around the slot between the members 19 and 20 and the space filled up with petrolatum or other compound. When this hardens the band may be removed and the insulating sleeve or baffle 26 slipped into place. Following this the insulating sleeve or baffle 27 which may also be made of porcelain is slipped into place. The sleeve or bell 17 may then be moved up into position and clamped to the sleeve 16 by the flanged joint 35. The connection may be made by wiped joints similar to 18. Where oil or thin compound is used, the space may be filled through the plugs 28 and 29 and an expansion member may be connected at any suitable point. The insulating member 19 has a metallized surface 30 which is in electrical contact with the sheath and bell or cover 16. This may be made through a spring 31 or other suitable means. This surface recedes gradually from the insulation and where the member 19 is made of a dielectric such as porcelain which has a dielectric flux constant approximately three times that of the cable insulation 12, the dielectric flux flows through the member 19 very readily and prevents charging current flowing along the surface of the cable. As the diameter is increased the sleeve 19 will take up more of the electrostatic stress. In order that charging current does not flow along the outer surface, this is screened by a control pocket 32. The members 19 and 20 will relieve insulation 12 of the cable of practically all longitudinal electrical stress or at least reduce this stress to the point where charging current will not flow along the cable. By the use of material which has a high specific inductive capacity, it is possible to shorten the joint, as the tapered surfaces may be flared much more than where a material of low specific inductive capacity is used. The baffles 26 and 27 prevent a radial discharge from the end of the metallized pockets 24. The tapered section of the member 27 may be metallized as at 33, electrical contact being made by a spring or other suitable means 34.

It is evident that the joint may be made up of several sleeves or members placed one over the other, so that the joint may be built up for practically any dielectric strength. The joint is so constructed that all parts may be readily made and assembled and its has the advantage in that no wrapping or other difficult work is necessary for making up the joint.

The joint consists essentially of members 19 for picking up the electrical stress gradually and coupling means for the conductor and external baffles to prevent discharge through the slot between the members 19 and 20. Over this is placed a bell or jacket joined to the cable sheath so that the intervening space may be filled with oil or suitable insulating compound.

I claim:—

1. The combination with a pair of cables having conductors, insulating coverings for said conductors and outer metal sheaths of terminal members for said cables having opposite threads thereon, a nut for engaging said threads to electrically connect said cables by rotation of said nut in one direction, dielectric sleeves surrounding said cables at opposite sides of said nut to permit access to said nut between adjacent ends of said sleeves, and flux control members for preventing discharge between said sleeves comprising conducting material extending backwardly into said sleeves away from the adjacent ends thereof, said conducting material being electrically connected with said nut.

2. The combination with a pair of cables having conductors, insulating coverings for said conductors and outer metal sheaths, of terminal members secured to the ends of said conductors, said terminal members being threaded in opposite directions, a nut for engaging said terminal members and drawing said members together by rotation of said nut in one direction, dielectric sleeves surrounding said cables at opposite sides of said nut to permit access to said nut between adjacent ends of said sleeves, and flux control members for preventing discharge between said sleeves, comprising conducting material extending backwardly into said sleeves away from the adjacent ends thereof, said conducting material being electrically connected with said nut, and an insulating sleeve overlapping the joint between said cables outside of said sleeves.

3. The combination with a pair of cables having conductors, and insulating coverings, of means for connecting the ends of said conductors, dielectric sleeves fitting over the ends of said cables and terminating adjacent the ends of said conductors but spaced from each other to permit access between the ends of said sleeves to the joint between said conductors, and an outer dielectric sleeve overlapping the space between the first mentioned sleeves for closing the space between the ends of said first mentioned sleeves.

4. The combination with a pair of cables each having a conductor and an insulating covering, of means for connecting adjacent ends of said conductors, dielectric sleeves covering the ends of said cables adjacent the joint between said conductors, the adjacent ends of said dielectric sleeves having pockets therein, and conductor members connected with said conductors and disposed within said pockets to form flux controls for directing the electrostatic flux away from the opening between the ends of said sleeves.

5. The combination with a pair of cables each having a conductor and a dielectric covering, of means for electrically connecting the ends of said conductors, dielectric sleeves surrounding the cables adjacent the joint between the ends of said conductors, said sleeves having metallized pockets therein for directing electrostatic flux away from the adjacent ends of said sleeves, and a third dielectric sleeve overlapping the ends of said first-named dielectric sleeves and breaking the joint therebetween.

6. The combination with a cable having a conductor, and insulating covering and an outer metal sheath, of a dielectric sleeve surrounding said insulating covering adjacent the end of said sheath, said sleeve being tapered outwardly and having a conductor covering forming substantially a continuation of said sheath, and a flange on said sleeve forming a pocket into which said conductor covering extends to provide a flux screen for preventing discharge over the surface of said sleeve.

7. The combination with a cable comprising a conductor, an insulating covering for said conductor and an outer metal sheath, of a dielectric sleeve surrounding said insulating covering adjacent the end of said sheath, the end of said sleeve being tapered toward said sheath and having a conductor covering on the outer surface of said tapered portion, said sleeve having a pocket therein into which said conductor covering extends to form a flux control, and a metallic bell surrounding said sleeve and electrically connected with said conductor covering.

8. The combination with a pair of cables each having a conductor, an insulating covering and an outer metal sheath, of means for electrically connecting adjacent ends of said conductors, dielectric sleeves surrounding portions of the ends of said cables adjacent the joint between said conductors from which said metal sheaths have been stripped, metallized pockets in the adjacent ends of said sleeves connected with said conductors and providing flux control members, the separated ends of said sleeves being tapered and having flux control pockets therein, conductor coverings for said tapered ends connected with the ends of said sheaths, a dielectric sleeve overlapping the space between said first-named dielectric sleeves, metallic bells for enclosing said dielectric sleeves, said bells having their opposite ends tapered inwardly and connected with the ends of said sheaths, and means for joining the adjacent ends of said bells to form a continuous housing connecting said sheaths.

9. The combination with a pair of cables having conductors, insulating coverings for said conductors and outer metal sheaths, of means for connecting the adjacent ends of said conductors, porcelain sleeves surrounding portions of the ends of said cables from which said sheaths have been stripped, a tubular dielectric member overlapping the adjacent ends of said porcelain sleeves, a third porcelain sleeve disposed outside of said tubular dielectric member, and a metallic housing enclosing said sleeves and tubular member and connecting the ends of said metallic sheaths.

10. The combination with a pair of cables having conductors, insulating coverings for said conductors and outer metal sheaths, of porcelain sleeves surrounding portions of the ends of said cables from which said sheaths have been stripped, the outer ends of said sleeves being tapered and disposed adjacent the ends of said sheaths while the inner ends of said sleeves are separated to permit access to the joint between said conductors, means for electrically connecting the ends of said conductors, said connecting means having a passage therethrough to permit access to the interior of said conductor for a filling compound, an insulating member bridging the space between the adjacent ends of said sleeves, said sleeves having pockets in the adjacent ends thereof to provide flux control members, and an outer metallic housing connecting the ends of said sheaths.

11. The combination with a pair of conductors having insulating coverings and outer metal sheaths of means for electrically joining the ends of said conductors, the metal sheaths being stripped from said conductors adjacent the ends thereof, porcelain sleeves surrounding the portions of said conductors from which the metal sheaths are stripped, the outer ends of said sleeves being disposed adjacent the ends of said sheaths and being tapered gradually away from said conductors, conducting members surrounding the tapered portions of said sleeves and forming continuation conductor surfaces from the extremities of said sheaths, a thin sleeve of dielectric material overlapping the adjacent ends of said first mentioned sleeves, and a porcelain sleeve disposed outside of said overlapping sleeve and also overlapping the adjacent ends of said first mentioned porcelain of sleeves.

12. The combination with a pair of conductors having insulating coverings and outer metal sheaths of a connector for joining the ends of said conductors, the metal sheath being stripped from a portion of each conductor adjacent the end thereof, separate porcelain sleeves surrounding the portions of said conductors from which the metal sheaths have been stripped and an outer porcelain sleeve overlapping the adjacent ends of said first mentioned sleeves and terminating short of the outer ends of said first mentioned sleeves, said first mentioned sleeves having the outer ends thereof tapered and coated with conducting material and having pockets therein forming flux controls adjacent the ends of said outer porcelain sleeve.

13. The combination with a conductor having an insulating covering, of a flux control member adjacent the end of said conductor, said flux control member comprising a sleeve of dielectric material having a higher dielectric flux constant than the insulating covering for said conductor, said sleeve being disposed about said conductor adjacent the end thereof and having a pocket in the end thereof adjacent the end of said conductor, and conducting material disposed within said pocket.

14. The combination with a conductor having an insulating covering, of a flux control member adjacent the end of said conductor, said member comprising a dielectric body having a pocket extending backwardly from the end thereof adjacent the end of said conductor and conducting material disposed within said pocket.

15. The combination with a pair of conductors having insulating covering, of means for connecting adjacent ends of said conductors, and sleeves about said conductors at opposite sides of the joint between the ends thereof, said sleeves being composed of dielectric material having a higher dielectric flux constant than the insulating covering for said conductors, the portions of said sleeves adjacent the joint between said conductors having pockets therein with closed ends extending away from said joint, and conducting material disposed within said pockets.

In testimony whereof I have signed my name to this specification on this 30th day of July, A. D. 1926.

ARTHUR O. AUSTIN.